United States Patent [19]
Sayegh et al.

[11] Patent Number: 5,412,749
[45] Date of Patent: May 2, 1995

[54] DUAL FIBER OPTIC ILLUMINATION BUNDLE

[75] Inventors: Emile G. Sayegh; Wendall D. Willey, both of Austin, Tex.

[73] Assignee: W. L. Gore & Associates, Inc., Newark, Del.

[21] Appl. No.: 143,264

[22] Filed: Oct. 26, 1993

[51] Int. Cl.$^6$ .............................................. G02B 6/04
[52] U.S. Cl. ...................................... 385/115; 385/901
[58] Field of Search ........ 385/100, 102, 106, 115-119, 385/121, 901

[56] References Cited

U.S. PATENT DOCUMENTS

| | | | |
|---|---|---|---|
| 3,814,081 | 6/1974 | Mori | 385/117 X |
| 4,730,096 | 3/1988 | Mizumoto | 385/117 X |
| 4,820,015 | 4/1989 | Mogi | 385/115 |
| 4,859,026 | 8/1989 | Arents | 385/116 |
| 4,867,529 | 9/1989 | Utsumi et al. | 385/117 |
| 5,046,816 | 9/1991 | Lehmann et al. | 385/117 |
| 5,208,889 | 5/1993 | Cedrone et al. | 385/116 X |
| 5,299,560 | 4/1994 | Hatori | 385/117 X |

FOREIGN PATENT DOCUMENTS 2027928  2/1980  United Kingdom .

Primary Examiner—John D. Lee
Attorney, Agent, or Firm—Samuels, Gary A.

[57] ABSTRACT

A fiber optic illumination cable comprises two fiber optic illumination bundles and a resilient, flexible, light-absorbent material which separates the two bundles. The first bundle has a generally round cross-section, and is covered with a resilient, flexible light-absorbent material. The second illumination bundle is disposed about and contiguous with the resilient, flexible, light-absorbent material layer which surrounds the first bundle. The second illumination bundle is cabled to form an annular ring, with a generally circular cross-section, which gives the final cable an even, full, round cross-section, with a low cross-sectional area. The two cabled illumination bundles are covered with a layer of a resilient, flexible material, which does not need to be light-absorbent, and a protective polymer jacket.

4 Claims, 2 Drawing Sheets

DUAL FIBER OPTIC ILLUMINATION BUNDLE

FIELD OF THE INVENTION

This invention relates to the field of fiber optics and more specifically to fiber optic illumination bundles comprised of multiple fiber optic strands.

BACKGROUND OF THE INVENTION

Fiber optic illumination bundles are commonly used to transmit light for illumination into restricted areas. Typical fiber optic illumination bundles are comprised of many hundreds or thousands of individual fiber optics bunched together to form a single light-transmitting bundle. Each fiber of the illumination bundle transmits light individually through the principle of total internal reflection, while the full bundle efficiently transmits large amounts of light from a source to the area to be illuminated. Fiber optic illumination bundles find use in medical devices such as arthroscopic probes and cameras, dental probes and cameras, and inspection probes for mechanical equipment.

Often it is necessary or desirable to have two separate fiber optic illumination bundles used together in close proximity to one another. It is generally advantageous to position such separate illumination bundles in such a manner that they form one cable for ease of use and handling. One common method of accomplishing such cabling is to individually jacket each bundle and twist one about the other, forming a twisted pair of illumination bundles. This method produces a large cable, the diameter being at least equal to the sum of the diameters of the individually jacketed illumination bundles. The large diameter results in a lack of flexibility, excess stress on the outer fiber optic strands, excess losses due to macrobending of the strands, as well as losses due to the extra fiber length required by the helical path of each bundle in the twisted construction. Another method of cabling separate illumination bundles is to jacket them as two pods of a flat cable, the jacket also forming a web between the pods. Again, such an arrangement results in a cable with a maximum cross-sectional dimension equal to at least twice the sum of the diameters of the component illumination bundles. Also, such a cable is not as flexible and usable as a round cable. A third method of grouping two separate illumination bundles into one cable is to simply bunch the two illumination bundles into one large bundle, being careful to keep each component bundle separate at the ends for termination. This method results in a smaller cross-sectional area than the first two methods, but has one major problem. When two illumination bundles are placed in contact with each other, light will be coupled into one bundle from the other where the fiber optics of the respective bundles are in contact with each other down the length of the cable. This coupling is known in the art as cross-talk. For bundles of reasonable size and usable lengths, cross-talk results in appreciable amounts of light leaving one bundle into the other. This loss of light from one bundle, and gain of unwanted light into the other is unacceptable, especially in applications where the fiber optic bundles are used in light sensing measurements.

The cable of the invention provides an improved solution to these problems, by providing a highly flexible cable of low cross-sectional area which does not allow the coupling of light from one illumination bundle to another.

SUMMARY OF THE INVENTION

The cable of the invention provides a cable comprised of two fiber optic illumination bundles and a soft, flexible, light-absorbent material which separates the two bundles. The first bundle has a generally round cross-section, and is covered with the soft, flexible light-absorbent material. This material is preferably at least one wrap of helically-wrapped, dark-pigmented expanded polytetrafluoroethylene (PTFE) tape, such as carbon-loaded expanded PTFE. The use of expanded PTFE with its low compressive modulus allows bending of the illumination bundle with minimal loss due to micro-bending of the individual fibers of the illumination bundle. Expanded PTFE can also withstand the high temperatures generally required at the source end of the cable due to the heat generation of the light source. The second illumination bundle is disposed about and contiguous with the soft, flexible, light-absorbent material layer which surrounds the first bundle. The second illumination bundle is cabled to form an annulus, with a generally circular cross-section, which gives the final cable an even, full, round cross-section, with a low cross-sectional area. The two cabled illumination bundles are then covered with a layer of a soft, flexible material, which does not need to be light-absorbent. This material is preferably at least one wrap of helically-wrapped, expanded polytetrafluoroethylene (PTFE) tape. The cable is then jacketed in a conventional manner, such as by extrusion of a thermoplastic polymer, or by the application of polymer shrink tubes.

DETAILED DESCRIPTION OF THE INVENTION

The cable of the invention and processes for its manufacture are now described with reference to the drawings to more fully and carefully delineate the components and materials used in the invention, and how they are assembled.

Figure 1A:
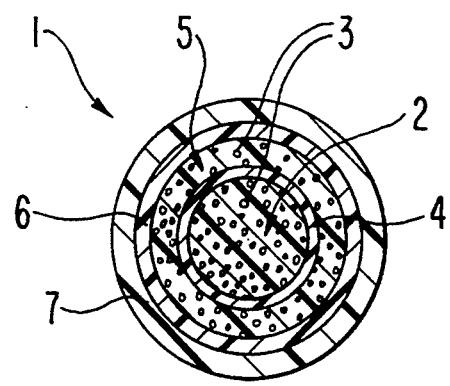
FIGS. 1A and 1B show cross-sectional views of the cable of the invention.
Figure 1B:
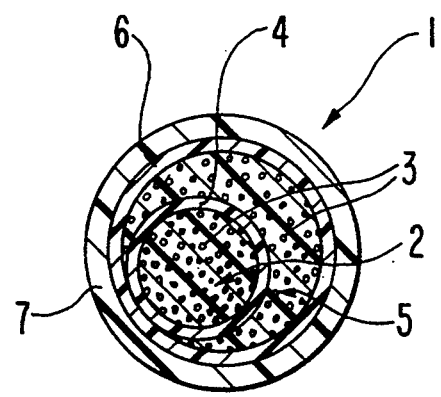

FIGS. 1A and 1B show in cross-section views the cable 1 of the invention. A first fiber optic illumination bundle 2 is comprised of a plurality of fiber optic strands 3. Each fiber optic strand 3 is comprised of a silica glass core covered with a cladding layer which has an index of refraction which is lower than that of the core. Such fiber optic strands are known in the art, and each strand may or may not also have a coating layer over the cladding. Such fiber optic strands may also be comprised of optically clear polymers such as polymethyl methacrylate, AF Teflon available from DuPont, and styrene. The first illumination bundle 2 is covered by a soft, i.e. resilient, dark-pigmented polymer buffer layer 4. "Dark" colors are those that absorb light at the wavelength transmitted in the fiber optic strands, and generally includes dark brown, dark gray, and black. For example, layer 4 may be cigarette-wrapped or helically wrapped strips of porous expanded PTFE tape which contains carbon black. The polymer buffer layer 4 is preferably selected from unsintered porous PTFE materials described in U.S. Pat. Nos. 3,953,566, 4,187,390, 3,962,153 and 4,096,227 which have an expanded porous structure characterized by nodes and fibrils, the disclosures of which are hereby incorporated by reference. The carbon-filled strips are made by slitting out a strip of selected width from a sheet of carbon-filled expanded PTFE. The carbon-filled sheet is prepared by a process described in U.S. Pat. No. 4,985,296. PTFE films containing about 25%–85% by weight carbon are calendared or paste extruded from carbon containing coagulated aqueous PTFE dispersions and stretched or expanded to yield films or sheets containing from about 3% to about 25% by weight carbon. The second fiber optic illumination bundle 5 is then disposed about layer 4 and is contiguous with layer 4 such that it at least partially surrounds layer 4 and the first bundle 2. The second fiber optic illumination bundle 5 is also comprised of a plurality of fiber optic strands 3. It is not necessary that the second bundle 5 completely surround the first bundle 2 and layer 4. FIG. 1A shows a cable where the second bundle 5 completely surrounds first bundle 2 and layer 4. FIG. 1B shows a cable where the second bundle 5 does not completely surround first bundle 2 and layer 4. Note that in both FIG. 1A and FIG. 1B the final cable is of generally round cross-section. A protective soft, i.e. resilient, binder 6 is applied over second bundle 5. The binder 6 is preferably comprised of at least one cigarette-wrapped or helically wrapped strip of expanded PTFE. The material used for the binder 6 is preferably the same material used for the dark-pigmented polymer buffer layer 4, however, binder 6 does not need to be dark-pigmented. Other soft, resilient materials may be used for binder 6 such as fabrics such as woven cotton, or non-woven felts. The cable is then enclosed in a protective polymer jacket 7 which should be flexible, and is made from any of the materials commonly used in the art for jacketing cables, such as polyvinyl chloride, polyethylene, polyurethane, rubber, silicone, polyester elastomers, and polymeric fluorocarbons such as fluorinated ethylene propylene, perfluorinated alkyl vinyl ether polytetrafluoroethylene and expanded polytetrafluoroethylene.

Figure 2:
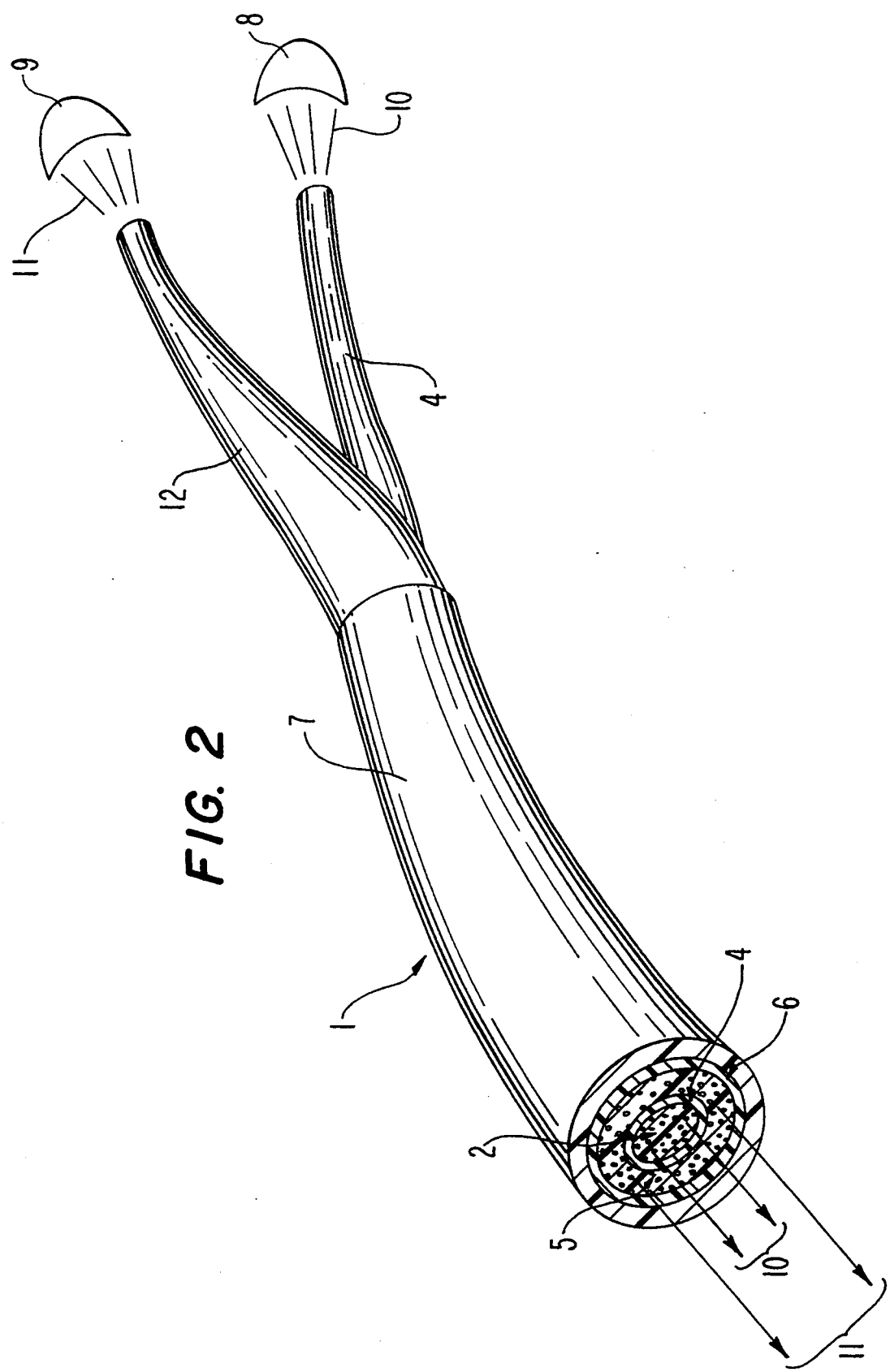
FIG. 2 shows a perspective view of the cable of the invention showing how the two illumination bundles are separated at the source end.

FIG. 2 shows the cable of the invention 1 in perspective view. This view shows how first and second light sources, 8 and 9 respectively, illuminate the first illumination bundle 2 and the second illumination bundle 5 separately and independently. Light 10 from source 8 enters and exits the first illumination bundle 2. Light 11 from source 9 enters and exits the second illumination bundle 5. The first fiber optic illumination bundle 2 is covered with a layer of dark-pigmented polymer buffer layer 4. A protective layer of polymer tubing 12 is used to protect the second fiber bundle 2 from the point where it separates from the first bundle 2. The ends of bundles 2 and 5 must be prepared and polished in ways known in the art. FIG. 2 shows that the light out of each bundle is a result of the transmission of light from each bundle's respective source only, and contains no light which was coupled in from another source.

Although specific embodiments of the invention have been described and illustrated, it is to be understood that modifications can be made without departing from the scope and spirit of the invention. Such modifications could include the use of high modulus strength member elements added to the cable, such as aramid fiber in stranded or braided form.

We claim:

1. A dual fiber optic illumination bundle cable comprising:
   (a) a first fiber optic illumination bundle having a generally round cross-section, said first fiber optic illumination bundle being comprised of a plurality of fiber optic strands, each of said fiber optic strands comprising in order a core and a cladding layer;
   (b) a dark-pigmented resilient polymer layer surrounding and contiguous with said first fiber optic illumination bundle;
   (c) a second fiber optic illumination bundle disposed about and at least partially surrounding said dark-pigmented polymer layer, said second fiber optic illumination bundle being comprised of a plurality of fiber optic strands just as said first fiber optic illumination bundle;
   (d) a resilient polymer layer surrounding and contiguous with said second fiber optic illumination bundle; and
   (e) a flexible protective polymer jacket surrounding and contiguous with said last mentioned resilient polymer layer.

2. The cable of claim 1 wherein said dark-pigmented polymer layer is comprised of carbon-filled expanded porous polytetrafluoroethylene.

3. The cable of claim 2 wherein said resilient polymer layer of element (d) is comprised of expanded porous polytetrafluoroethylene.

4. The cable of claim 1 wherein said protective polymer jacket is made of material selected from the group consisting of polyvinyl chloride, polyethylene, polyurethane, rubber, silicone, polyester elastomers, and polymeric fluorocarbons.

* * * * *